Figure 1:
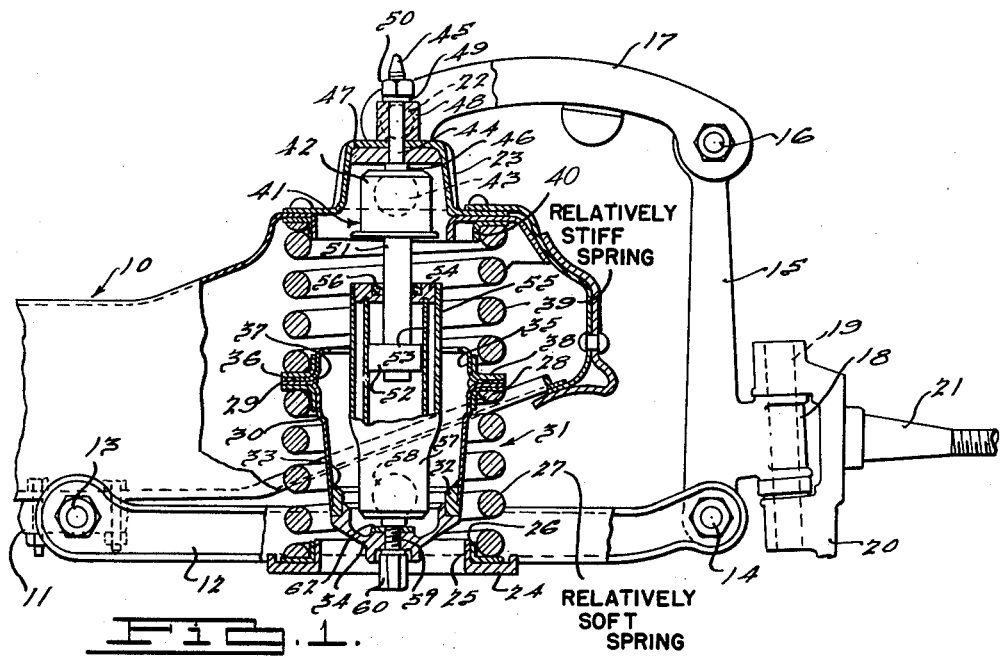

Dec. 11, 1951 R. N. JANEWAY ET AL 2,578,138
SUSPENSION
Filed Aug. 29, 1945

INVENTORS.
Robert N. Janeway,
Philip H. Fretz.
BY
Harness and Harris
ATTORNEYS.

Patented Dec. 11, 1951

2,578,138

UNITED STATES PATENT OFFICE 2,578,138

SUSPENSION

Robert N. Janeway, Detroit, and Philip H. Pretz, Wing Lake, near Birmingham, Mich., assignors to Chrysler Corporation, Highland Park, Mich., a corporation of Delaware Application August 29, 1945, Serial No. 613,290

3 Claims. (Cl. 267—20)

This application relates to a vehicle suspension system. More specifically, it relates to a special arrangement of parts involving springs and a shock absorber.

It has been determined that it is desirable in the suspension of certain vehicles to provide a resilient spring series, a portion of which is free and undamped, and another portion of which has connected in parallel therewith a shock absorber. By this arrangement it is possible to cushion impacts in the free and undamped spring means, which impacts tend to be transmitted through the shock absorber in by-passing relation to the spring means in parallel with the shock absorber. We have applied the above suspension to automotive vehicles, for example, in the connection of a steerable wheel to the vehicle frame. We have invented a novel arrangement of this suspension that will advantageously fit within the small space available.

An object of the present invention is to provide an improved suspension involving springs in series and a shock absorber connected across one spring. The suspension may also include pivoted links leading to a steerable wheel.

A further object is to make improvements in the arrangement of springs and a shock absorber such that these parts may occupy a small space.

Another object is to provide a structural arrangement enabling a shock absorber to be placed within two springs in series and to be connected in parallel with one of them. This involves improvement in a member that is placed between the two springs and is connected to one end of the shock absorber.

Other objects will appear from the disclosure.

Figure 2:
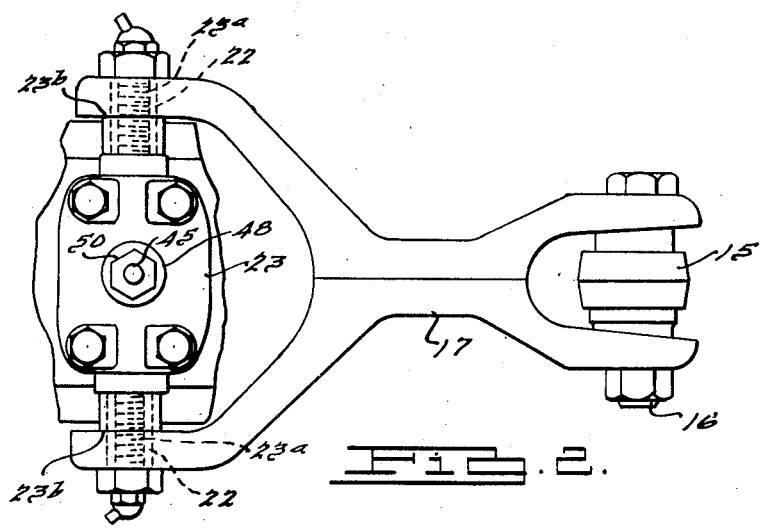

In the drawings:

Fig. 1 is a view partially in section of one end of a motor vehicle showing the novel wheel suspension of the present invention connected therewith; and Fig. 2 is a plan view of one of the suspension links.

The reference character 10 designates a frame member of an automotive vehicle. A bracket 11 attached to the lower side of the frame member carries a bolt 13 forming a pivotal connection to the frame member for one end of a long lower link 12, which may be of the wishbone type. The other end of the link is pivotally connected by a bolt 14 to the lower end of a carrying member 15. The upper end of the carrying member is pivotally connected by the bolt 16 to an upper short link 17, which is of the wishbone type as shown in Fig. 2. The carrying member 15 has a knuckle-supporting portion 18 upon which is pivotally mounted by means of a king pin 19, a knuckle 20. Integral with the knuckle is a spindle 21 adapted to support a steerable wheel, not shown. The inner end of the upper link 17 is formed of spaced portions which are pivotally connected by tubular bolts 22 to a bracket structure 23 secured to the upper side of the frame member 10. The bracket 23 has threaded extremities 23ª upon which the tubular bolts 22 are threaded so as to hold the inner end portions of the upper arm 17 against shoulders 23ᵇ formed at the ends of the bracket 23.

The lower link 12 carries a ring 24 having a flange 25 on its inner periphery. The ring 24 supports a flanged ring 26 of an unyielding metallic or non-metallic substance, on which rests the lower end of a relatively soft coil spring 27. The upper end of the coil spring 27 engages a flanged ring 28 formed of an unyielding metallic or non-metallic substance, which in turn engages a flange 29 formed on a shell 30 forming part of a cup member 31. The cup member also includes a ring 32 welded or soldered, as indicated at 33, to the lower end of the shell 30 and a base part 34 secured to the ring 32. A ring 35 has a flange 36 engaging the flange 29 and is welded or soldered, as indicated at 37, to the shell 30. The ring 36 carries a flanged ring 38 formed of an unyielding metallic or non-metallic substance, which is engaged by the lower end of a relatively stiff coil spring 39. This circumstance of the upper spring 39 being relatively stiff as contrasts lower spring 27 being relatively soft may be readily achieved by proper heat treatment of it or by other and well known means of changing the crystalline structure thereof notwithstanding the fact that the wire diameter of the individual coils may desirably be identical for both springs. The upper end of the coil spring 39 engages a flanged ring 40 formed of an unyielding metallic or non-metallic substance, held against the under side of the top of the frame member 10 by the spring 39.

Positioned within the springs 27 and 39 is a shock absorber 41. The shock absorber includes an upper part 42 having a spherical recess receiving a ball-shaped end 43 formed on a bolt 44 which projects upwardly through the bracket 23 and terminates in a pointed end 45. The bolt 44 has a shoulder 46 resting against the lower side of the reinforcing piece 47 located within the bracket 23. The bolt passes through the reinforcing piece 47 and through a block 48 resting on top of the bracket 23, which block along with a washer 49 spaces a nut 50 threaded on the bolt 44 from the bracket 23. The part 42 of the shock absorber carries integrally therewith a piston rod 51 to the lower end of which is attached a conventional shock absorber piston 52 which may have valve-controlled passages extending therethrough. The piston 52 is slidably mounted in a sleeve 53 the upper end of which is attached to a bushing 54 to which is also attached the upper end of an outer sleeve 55. A seal 56 set in the bushing 54 acts against the piston rod 51. The outer sleeve 55 is attached to a part 57 which has a spherical recess containing a ball-shaped end 58 formed on a bolt 59. The bolt 59 extends through the base part 34 and is secured thereto by a nut 60. A shoulder formed on the bolt 59 abuts a washer 62 in turn abutting the base part 34.

It should be noted that there is no flexibility axially of the shock absorber in the connection of the part 57 at the lower end of the shock absorber 41 with the base part 34 of the cup 31 since the various connecting elements provide an unyielding mounting involving universal movement about the ball end 58. The same is true of the upper end of the shock absorber; the part 42 is unyieldingly connected to the bracket 23 through various elements including the bolt 44 with universal movement permitted about the ball end 43.

With the shock absorber 41 and the springs 27 and 39 arranged as described, the shock absorber dampens all vibrations that tend to be transmitted through the upper relatively stiff coil spring 39 and the lower relatively soft coil spring 27 is free to cushion impact. It is desirable to have the shock absorber 41 connected in parallel with only one of the coil springs 27 and 39, for it has been discovered that the shock absorber could actually transmit rather than absorb certain shocks of impact in bypassing relation to the springs. Thus a free and undamped spring, which the shock absorber cannot cause to be bypassed, is indicated as desirable. By the invention of the present application a compact arrangement of springs and shock absorber is effected, the shock absorber being positioned within both springs and yet being connected in parallel across only one spring. The cup member 31 makes this possible. The shock absorber with its inflexible end connections dampens vibrations of any masses associated with the the system such as the wheel and its immediately associated parts, the body-supported mass or sprung mass, and the intermediate mass associated with the spring seats and shock absorber, which vibrations tend to be transmitted through the springs 27 and 39 in series, since any vibration involves displacement of both springs. The free coil spring, which in this case happens to be the soft spring is free to cushion impact, since there is no tendency for the shock absorber to by-pass this spring. Although it might appear that this arrangement would not prevent wheel dance, i. e., vibration of wheel and associated mass between the tire and spring suspension, actually the arrangement will prevent wheel dance, because the series arrangement of the springs transmits any displacement of the undamped spring to the damped spring and the shock absorber connected thereacross.

It is also possible to reverse the arrangement of springs, i. e., to make the undamped spring a relatively stiff one and the damped spring a relatively soft one.

In the copending application of Robert N. Janeway, Serial No. 613,291 filed August 29, 1945, there is claimed the broad application of a spring series and a shock absorber connected in parallel with only one of the springs to a suspension involving pivoted links for a steerable wheel.

We claim:

1. In a vehicle, a body-connected member, a wheel carrier, link members pivotally connected at one end to the body-connected member and at the other end to the wheel carrier, a cup-shaped intermediate support provided with a flange at the edge remote from the base, a first coil spring acting between the body-connected member and one side of the flange on the intermediate support, a second coil spring acting between one link member and the other side of the flange and being axially aligned with the first coil spring, the cup-shaped intermediate support being positioned within the second coil spring and an hydraulic telescopic shock absorber to provide damping means positioned within the first coil spring and the intermediate support and respectively end-connected to the base of the intermediate support and to the body-connected member against which the said first coil spring acts, the damping means thereby acting in parallel with the said first coil spring to absorb energy upon all relative movement of the parts toward and away from one another between which the said first coil spring is connected and to leave the said second coil spring free to cushion impact, the damped coil spring being relatively stiff, and the undamped coil spring being relatively soft.

2. In a vehicle, a body-connected member, a wheel carrier, links pivotally connected at one end to the body-connected member, and at the other end to the wheel carrier, a cup-shaped intermediate support provided with a flange part edge remote from the base, a first coil spring disposed between and engaging the body-connected member and one side of the flange on the intermediate support, a second coil spring disposed between and engaging one link and the other side of the flange and being axially aligned with the first coil spring and containing said cup-shaped intermediate support, a double-ended telescopic shock absorber to provide damping means positioned within the first coil spring and the intermediate member and having articulated mountings detachably connecting the respective ends thereof to the remote base of the intermediate support in the second spring and to the body-connected member so as to act in parallel with the first coil spring to absorb energy upon all relative movement of the parts toward and away from one another between which the first coil spring is connected and to leave the second coil spring free to cushion impact.

3. A suspension system for a wheeled vehicle having a frame, including a wheel-carrying member, vertically spaced suspension arms extending outwardly of the vehicle and having their outer ends connected to the wheel-carrying member, suspension spring means connected between and engaging the suspension system and the vehicle frame, and including vertically aligned coil springs, the upper one of which engages the under side of the top of the vehicle frame, a cup-shaped intermediate support inverted so as to have the base thereof disposed within the lower one of the coil springs and having a flange remote to the base interposed between and held by the springs, means connecting the upper suspension arm to the top of the frame and means connecting the lower suspension arm to the frame for pivotal movement in a vertical plane, and a double-ended telescopic shock absorber positioned within the upper coil spring and the intermediate support and having articulated mountings detachably connecting the respective ends of the shock absorber one to the base of the intermediate support, and one to the vehicle frame, said upper coil spring being relatively stiff and said lower coil spring being relatively soft and engaging said lower suspension arm outwardly of its point of connection to the frame.

ROBERT N. JANEWAY.
PHILIP H. PRETZ.

REFERENCES CITED

The following references are of record in the file of this patent:

UNITED STATES PATENTS

| Number | Name | Date |
| --- | --- | --- |
| 1,655,786 | Querritore | Jan. 10, 1928 |
| 1,702,675 | Ventura | Feb. 19, 1929 |
| 2,093,259 | Wightman | Sept. 14, 1937 |
| 2,260,634 | Mullner | Oct. 28, 1941 |
| 2,299,935 | Slack et al. | Oct. 27, 1942 |
| 2,314,505 | McIntyre et al. | Mar. 23, 1943 |
| 2,338,478 | Wulff | Jan. 4, 1944 |
| 2,387,732 | Bailey | Oct. 30, 1945 |

FOREIGN PATENTS

| Number | Country | Date |
| --- | --- | --- |
| 377,789 | Italy | Jan. 5, 1940 |
| 400,134 | Great Britain | Oct. 19, 1933 |
| 465,550 | Great Britain | May 10, 1937 |
| 570,183 | Great Britain | June 26, 1945 |
| 844,796 | France | May 1, 1939 |